United States Patent
Harijan et al.

(10) Patent No.: US 10,977,015 B1
(45) Date of Patent: *Apr. 13, 2021

(54) METHOD AND APPARATUS FOR AUTOMATIC MODIFICATION OF APPLICATIONS FROM RETRIEVED INSTRUCTIONS

(71) Applicant: Rovi Guides, Inc., San Jose, CA (US)

(72) Inventors: Kuppappa Dandappa Harijan, Karnataka (IN); Alok Kumar, Karnataka (IN); Madhusudhan Srinivasan, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/670,812

(22) Filed: Oct. 31, 2019

(51) Int. Cl.
*G06F 8/40* (2018.01)
*G06F 16/732* (2019.01)
*G06F 16/9032* (2019.01)
*G06F 16/14* (2019.01)

(52) U.S. Cl.
CPC ............... *G06F 8/40* (2013.01); *G06F 16/156* (2019.01); *G06F 16/7328* (2019.01); *G06F 16/90332* (2019.01)

(58) Field of Classification Search
None
See application file for complete search history.

(56) References Cited

U.S. PATENT DOCUMENTS

| | | | |
|---|---|---|---|
| 7,765,097 B1* | 7/2010 | Yu | G06F 8/30 704/9 |
| 9,372,672 B1* | 6/2016 | Thomas | G06F 8/40 |
| 2006/0217159 A1* | 9/2006 | Watson | H04M 1/72522 455/563 |
| 2013/0129307 A1* | 5/2013 | Choe | A63F 13/48 386/227 |
| 2014/0059076 A1* | 2/2014 | Bayer | G06F 16/632 707/769 |
| 2014/0172836 A1* | 6/2014 | Chowdhury | G06F 16/739 707/722 |
| 2015/0222848 A1* | 8/2015 | Liu | G06F 16/35 348/468 |
| 2015/0356077 A1* | 12/2015 | Kristjansson | G10L 13/00 704/2 |
| 2017/0255445 A1* | 9/2017 | Seolas | G06F 40/40 |
| 2018/0137094 A1* | 5/2018 | Zhou | G06F 40/45 |
| 2020/0285636 A1* | 9/2020 | Liu | G06F 40/263 |

OTHER PUBLICATIONS

U.S. Appl. No. 16/670,990, filed Oct. 31, 2019, Kuppappa Dandappa Harijan.

* cited by examiner

*Primary Examiner* — Qing Chen
(74) *Attorney, Agent, or Firm* — Haley Guiliano LLP

(57) ABSTRACT

Systems and methods for automatically carrying out instructions for modifying application programs, when those instructions are found from electronic searches. A user may wish to modify operation of an application program in some way. He or she can thus conduct an electronic search for the solution. Search results in the form of text- (e.g., web pages) or audio/video- (e.g., DIY videos) based files are automatically translated into computer executable code. This executable code is then transmitted to the user's device, where it is automatically executed by the device to modify the application program in the desired manner.

20 Claims, 8 Drawing Sheets

METHOD AND APPARATUS FOR AUTOMATIC MODIFICATION OF APPLICATIONS FROM RETRIEVED INSTRUCTIONS

BACKGROUND

Embodiments of the disclosure relate generally to application programs. More specifically, embodiments of the disclosure relate to automatic modification of application programs from retrieved instructions.

SUMMARY

Widely available access to the Internet and other electronic communications networks allows users to easily search for information. These communications networks also provide convenient access to many different publicly available forums and other platforms by which information can be shared. As a result, users currently find that almost any type of information they seek has been posted online where it is readily accessible at any time. As one example, users may relatively easily search for and retrieve solutions to many problems presented by application programs. For instance, users may wish to disable an undesired feature of an application program, such as an overly-sensitive auto-rotate feature of a mobile device application, but may not know how. The solution is typically available online. To solve this problem then, users may simply conduct an electronic search for how to disable auto-rotate in their particular application, and view the appropriate search results. Returned results often include step-by-step text- or video-based instructions for how to solve the particular problem, e.g., in this case, how to disable auto-rotate in this particular application. Solving the user's auto-rotate problem then involves simply carrying out these instructions.

This process is not without its difficulties, however. Even though instructions for solving a particular problem may be readily retrieved automatically via search engine, users still must implement these instructions manually. This becomes difficult and tedious when the instructions are long, difficult and involved, or require extensive background knowledge that the user may not have.

Accordingly, to overcome the lack of mechanisms for automatically implementing instructions for modifying application programs, systems and methods are described herein for a computer-based process that automatically translates such retrieved instructions into executable code that automatically modifies the application program for the user. The retrieved instructions may be in text form, audio form, or video form.

In one embodiment, a user may initiate a search for information describing how to modify some operation of an application program. Results of this search may comprise instructions teaching the user how to modify the application accordingly, such as a text-based set of instructions or a do it yourself (DIY) audio or video file. These instructions may be received and automatically translated into computer executable code, such as by automatically parsing a text file to determine the instructions, and converting the instructions to machine code. This machine code is then sent to the device on which the application program is run, where it is executed by, for example, the operating system of the device.

As noted above, the retrieved search results may be in text form, such as links to web pages with text-based instructions. These natural language instructions can be automatically translated into computer code using programs and methods for parsing text to determine instructions, and code and programs for converting determined instructions into computer executable code.

The device running the application in question may be the same device on which the search is conducted, or may be a different device. In either case, results are received from the device on which the search is conducted, translated into executable code, and the executable code is in turn transmitted to the device on which the application resides.

The executable code may be executed in any manner, to modify the application program in question. In one embodiment, the executable code may be executed by the operating system on which the application program is run. In this embodiment, a computing device has both an operating system and the application program stored thereon. The executable code is transmitted to the device, where it is stored and/or executed by the device's operating system. The code instructs performance of various operating system functions on the application, directing inputs to the application in a specified sequence that modifies the application as desired.

As the executable code directs various operating system functions to generate inputs to the application program, at least some embodiments entail execution of the executable code while the application program is being run. Other embodiments have no such requirement however, and at least some embodiments allow for execution of the executable code while the application program is not running, i.e., is asleep or has not yet been started.

Embodiments of the disclosure provide automatic execution of the executable code. In such embodiments, the executable code may contain instructions directing the operating system to automatically carry out the executable code, so that code execution is initiated without user input.

Embodiments of the disclosure encompass any form of search result. That is, users may search for solutions to problems posed by their application programs, and the results of those searches may be in any format. For example, search results returned may be text-based documents or files such as DIY web pages containing written instructions for users to follow in modifying their application programs, or may be video files verbally and/or visually describing how to perform such modifications. When the relevant search result is a video file, the video is first automatically translated into natural language instructions. Spoken words in the video are automatically converted to text using one or more speech-to-text programs, where the text is the set of natural language instructions conveyed by the video. Next, as above with text-based instructions, the natural language text is translated into computer executable code.

To assist in the above process, metadata may be appended to the search results prior to their translation into code. The metadata assists in identifying the correct code to use. More specifically, a database of executable code snippets can be stored, representing code for carrying out various functions of many different operating systems. When a particular application modification requires certain operating system functions to carry out, the code for carrying out these functions is selected from the database. In this manner, a complete set of executable code for carrying out the application modification can be assembled for transmission to a particular device for execution. The appended metadata may include such information as the relevant operating system, application, and application settings to be modified, thus assisting in identifying and retrieving the correct executable code snippets that correspond to the correct operating system functions for modifying the application or application settings.

Other embodiments of the disclosure describe further details of video-based search results. In one such embodiment, retrieved videos are translated into text, and the text is in turn divided into segments each corresponding to one step in the process of modifying the application as desired. As each step often involves a single operation, each step also often corresponds to a single code snippet or set of code snippets such as those described above. The process of breaking instructions into discrete steps thus facilitates the process of translating the steps into executable code.

To accomplish this process, a user may initiate a search for information describing how to modify some operation of an application program. Results of this search may comprise a video file such as a DIY video. This video file is automatically translated into corresponding natural language text as above, and the text is divided into segments each corresponding to one instruction in the process of modifying the application program. A corresponding code snippet is retrieved for each text segment, i.e., each instruction. The code snippets are assembled into a set of executable code, and this set is transmitted to the device running the application, for execution by the device operating system.

Text may be divided into segments in any manner. As one example, certain predetermined keywords may be identified, which indicate the beginning or end of segments. For instance, terms such as "next" may indicate the beginning of a new instruction, and thus the beginning of a segment, while terms like "first" may indicate the beginning of the first of a series of instructions. As another example, text may be segmented using a natural language understanding application to parse the text into segments each having a distinct context or meaning.

As in previous embodiments, metadata may be employed here to assist in retrieving the correct code snippets. For example, metadata may be appended to the natural language text as above, to help identify the correct snippet for each instruction.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to systems and methods for automatically carrying out instructions for modifying application programs, when those instructions are found from electronic searches. A user may wish to modify operation of an application program in some way, but may not know how to do so. He or she can thus conduct an electronic search for the solution. Search results in the form of text- (e.g., web pages) or video- (e.g., DIY videos) based files are automatically translated into computer executable code. This executable code is then transmitted to the user's device, where it is automatically executed by the device to modify the application program in the desired manner.

For example, a user may wish to change the default format settings of a word processing application, but may not know how to do so. He or she may thus conduct an electronic search for the solution, and may receive a link to a relevant web page that contains the solution. The text of this web page is parsed to determine the instructions, and the instructions are then converted to executable machine code. This code is then transmitted to the user's device, where it is automatically executed by the device to modify the application program. In this manner, application programs may be automatically modified as desired, freeing users from manually carrying out modifications.

Figure 1:
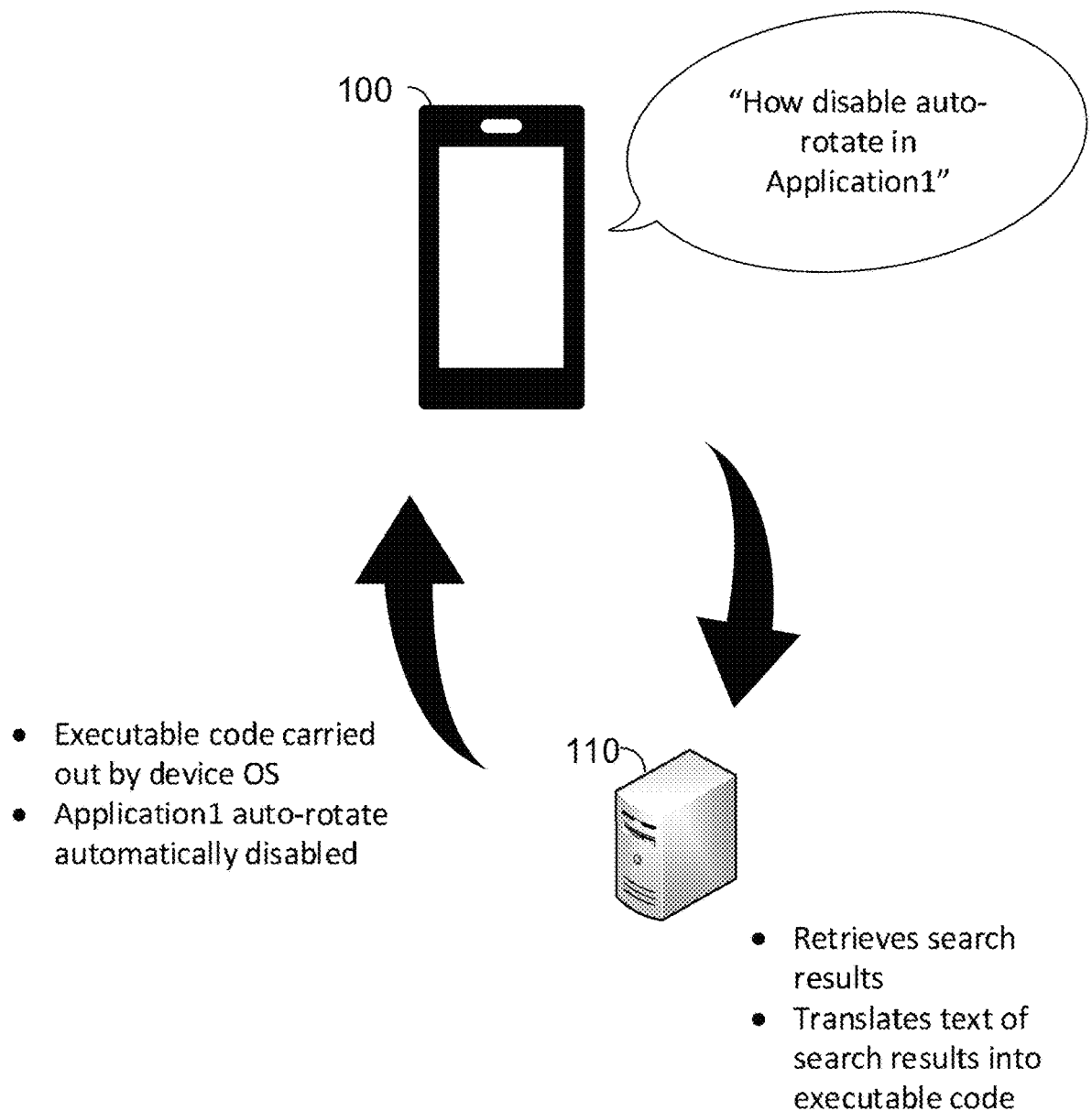
FIG. 1 illustrates an exemplary process of automatically implementing instructions for modifying application programs, in accordance with embodiments of the disclosure.

FIG. 1 illustrates an exemplary process of automatically implementing instructions for modifying application programs, in accordance with embodiments of the disclosure. Here, an electronic device 100, which can be a smartphone, is in wired or wireless electronic communication with a server 110 via a communications network. A user of smartphone 100 may encounter a problem with an application program running on his or her device 100, such as an overly-aggressive auto-rotate feature that rotates the screen's orientation when the user does not want the screen to be rotated. Accordingly, the user may wish to disable the auto-rotate feature in this application. If the user does not know how to do so, he or she can conduct an electronic search for directions describing how to disable auto-rotate in this particular application, by for example entering a search query such as "how disable auto-rotate in Application1", where "Application1" is the name of the application program in question. The search may be initiated or carried out by server 110, which retrieves results returned from the search. One such result may be a web page containing DIY instructions for disabling auto-rotate in Application1. The server 110 translates the text of this web page into executable code that directs the device 100 to automatically modify its Application1. The server 110 then transmits this executable code to device 100 where it is automatically executed to, for example, carry out operating system functions of device 100 to input modifications to Application1, disabling its auto-rotate feature.

Figure 2:
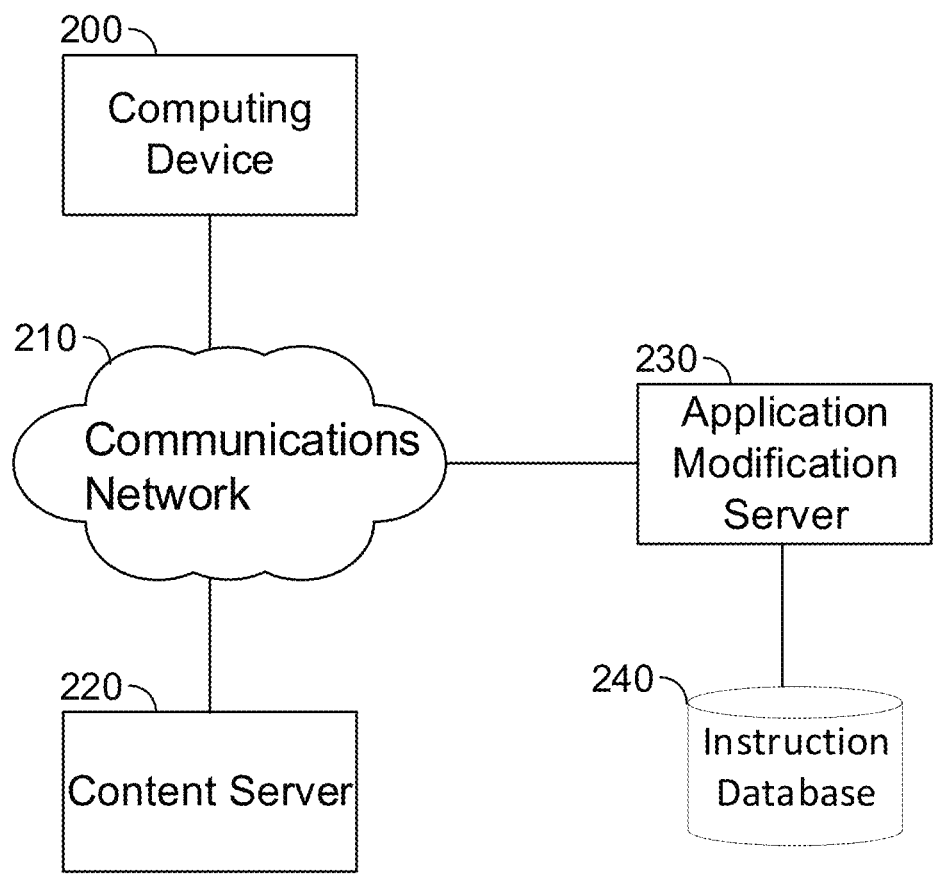
FIG. 2 is a block diagram illustration of a system for implementing the process of FIG. 1.

FIG. 2 is a block diagram illustration of a system for implementing the process of FIG. 1. A computing device 200 may be in communication with an application modification server 230 through, for example, a communications network 210. Here, computing device 200 may correspond to device 100, and application modification server 230 may correspond to server 110. Application modification server 230 is in electronic communication with an instruction database 240, which may be a remote database or may be stored on application modification server 230 itself. Both computing device 200 and application modification server 230 may be in electronic communication with a content server 220 through communications network 210. Content server 220 may be any server storing any electronic content accessible to either computing device 200 or application modification server 230. For example, content server 220 may store one or more files that contain instructions for modifying application programs. Links to these files may be returned to server 230 in response to electronic searches. Any number of content servers 220 may be present, each in electronic communication with both device 200 and server 230 through communications network 210.

Figure 3:
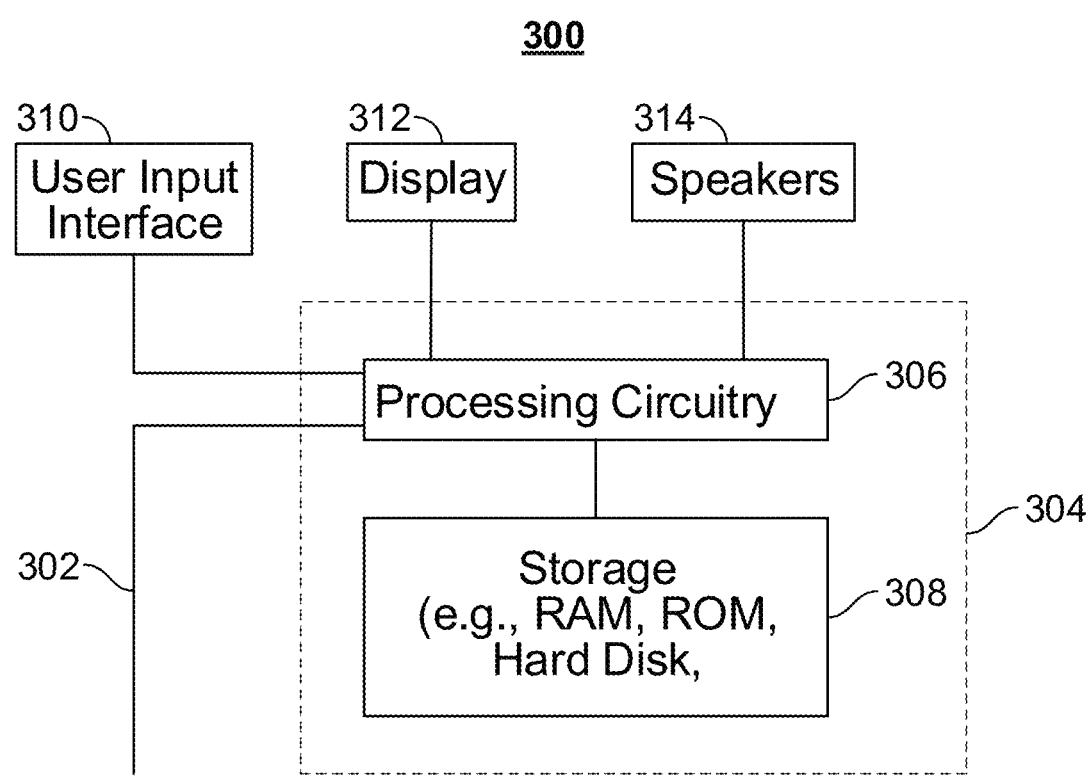
FIG. 3 is a generalized embodiment of illustrative electronic computing devices constructed for use according to embodiments of the disclosure.

The computing device 200, e.g., device 100, may be any device capable of running one or more application programs and engaging in electronic communication with server 230. For example, computing device 200 may be a digital TV, laptop computer, smartphone, tablet computer, or the like. FIG. 3 shows a generalized embodiment of an illustrative user equipment device 300 that may serve as a computing device 200. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for receiving streamed content and executing its display, such as executing application programs that provide interfaces for content providers 140 to stream and display content.

Control circuitry 304 may thus include communications circuitry suitable for communicating with a content provider 140 server or other networks or servers. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other.

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage may be used to supplement storage 308 or instead of storage 308.

Storage 308 may also store instructions or code for an operating system and any number of application programs to be executed by the operating system. In operation, processing circuitry 306 retrieves and executes the instructions stored in storage 308, to run both the operating system and any application programs started by the user.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be included. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

Figure 4:
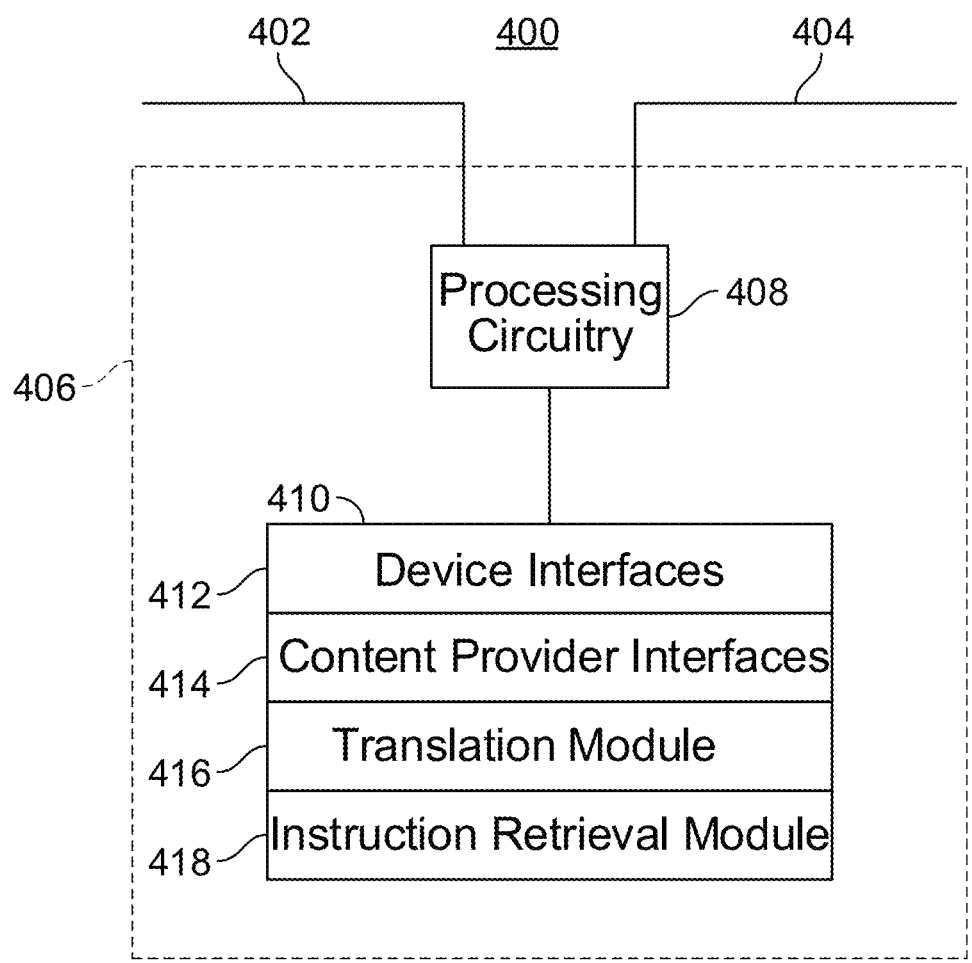
FIG. 4 is a generalized embodiment of an illustrative application modification server constructed for use according to embodiments of the disclosure.

FIG. 4 is a generalized embodiment of an illustrative application modification server 230 constructed for use according to embodiments of the disclosure. Here, device 400 may serve as an application modification server. Device 400 may receive content and data via I/O paths 402 and 404. I/O path 402 may provide content and data to the various content consumption devices 110 and 130, while I/O path 404 may provide data to, and receive content from, one or more content providers 140. Like the user equipment device 300, the device 400 has control circuitry 406 which includes processing circuitry 408 and storage 410. The control circuitry 406, processing circuitry 408, and storage 410 may be constructed, and may operate, in similar manner to the respective components of user equipment device 300.

Storage 410 is a memory that stores a number of programs for execution by processing circuitry 408. In particular, storage 410 may store a number of device interfaces 412, content provider interfaces 414, translation module 416 for parsing text to determine instructions and converting these instructions to executable code, and user profiles 418. The device interfaces 412 are interface programs for handling the exchange of commands and data with the various devices 200. Content provider interfaces 414 are interface programs for handling the exchange of commands and content streams with various content servers 220. A separate interface 414 may exist for each different content server 220 that has its own format for commands or content. Content may be any form of content, including audio content such as podcasts and e-books, video content such as videos, movies, audio and video content, and the like. Translation module 416 includes code for executing all of the above described functions for automatically modifying application programs, including a search engine interface for transmitting search requests and receiving returned results, a web page or other document parser for extracting text from web pages or other documents and isolating instructions therefrom, a speech to text module for converting spoken words from video or audio files to text, and conversion code for reading metadata and determining instructions. Instruction retrieval module 418 is a program for retrieving code snippets from database 240, which correspond to the DIY or other instructions determined by translation module 416, assembling the retrieved snippets into executable code, and sending the executable code to device interface 412 for transmission to device 200, where it is executed to modify an application program.

The device 400 may be any electronic device capable of receiving search queries and converting search results to executable code. For example, the device 400 may be a server, or a networked in-home smart device connected to a home modem and thereby to various content servers 200. The device 400 may alternatively be a laptop computer or desktop computer configured as above.

Figure 5:
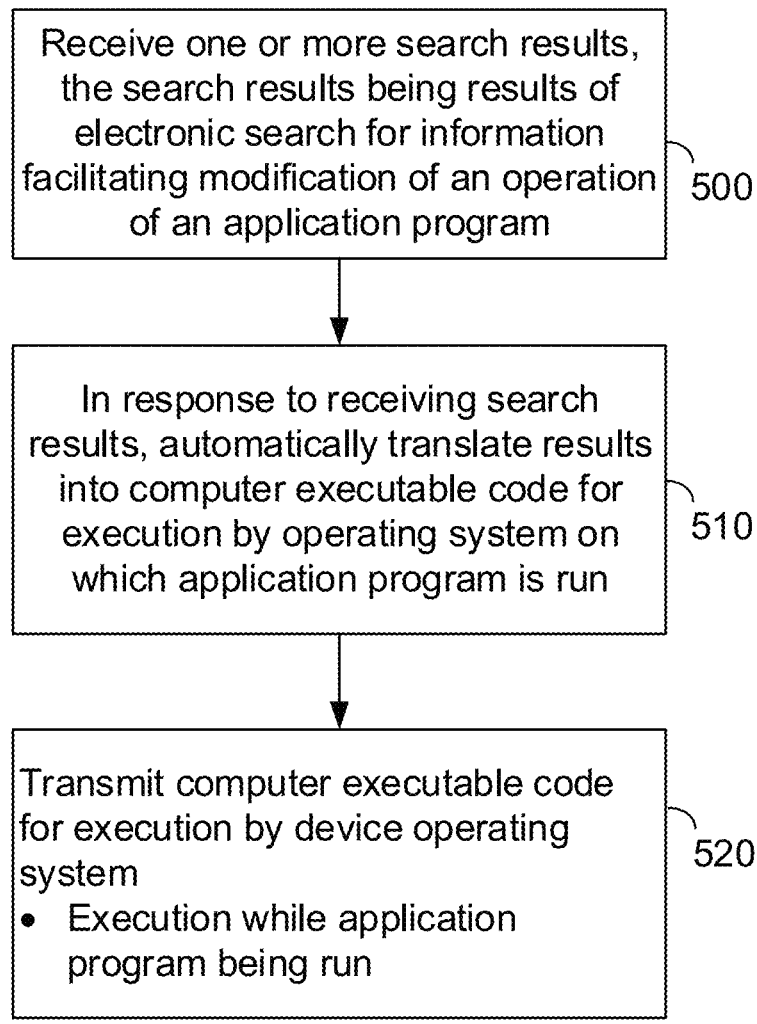
FIGS. 5-8 are flowcharts illustrating process steps for automatically implementing instructions for modifying application programs, in accordance with embodiments of the disclosure.

FIG. 5 is a flowchart illustrating process steps for automatically implementing instructions for modifying application programs, in accordance with embodiments of the disclosure. Initially, application modification server 230 receives one or more search results, each of which are results of an electronic search for information on how to modify some operation of an application program (Step 500). Search results may be from any search conducted on or initiated by any device. For example, the search may be conducted on or initiated by device 200, which transmits its search results to application modification server 230 such as through an application program on device 200 that conducts electronic searches and transmits results to the application modification server 230. Alternatively, the search may be initiated by device 200 through server 230. That is, server 230 may receive user-entered search query strings from device 200 through device interface 412, carry out the search or perhaps initiate the search at a remote server, and receive search results. Users may initiate searches from any device 200, whether from the same device 200 on which the application program resides or from a different device.

In response to receiving results from the above search, the application modification server 230 automatically translates the results into computer executable code for execution by device 200 (Step 510). More specifically, the code can be executed by the operating system of device 200 to utilize operating system and other functions that act to modify the application program in the desired manner.

The application modification server 230 then transmits the executable code to the device 200, i.e. the device running the application program in question, for execution by the device 200 (Step 520). Often, the executable code involves performing operating system functions on the application program while it is running. That is, the device 200 can modify the application program by, for instance, opening the application and using various operating system functions to input the correct settings to the application. As one example, the executable code can open an application, then direct the operating system to input swipe and selection (e.g., touch input at a particular screen position) commands to access the correct settings page and select or input the desired settings changes. Execution of the executable code may thus be performed while the application program is being run, e.g., is already opened, or the executable code may include instructions directing the operating system to first open the application program, awaken the application program, or the like. Thus, the executable code may be run while the application program it modifies is already open, or may be run prior to opening the application or while the application is in a sleep mode.

Figure 6:
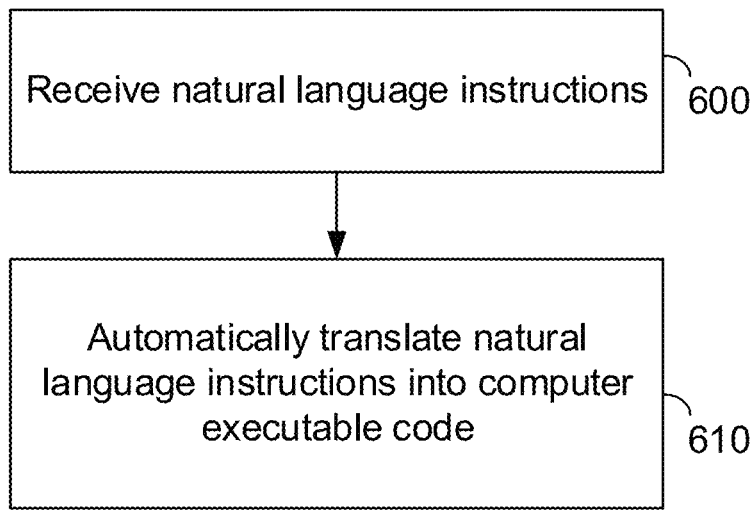
Figure 7:
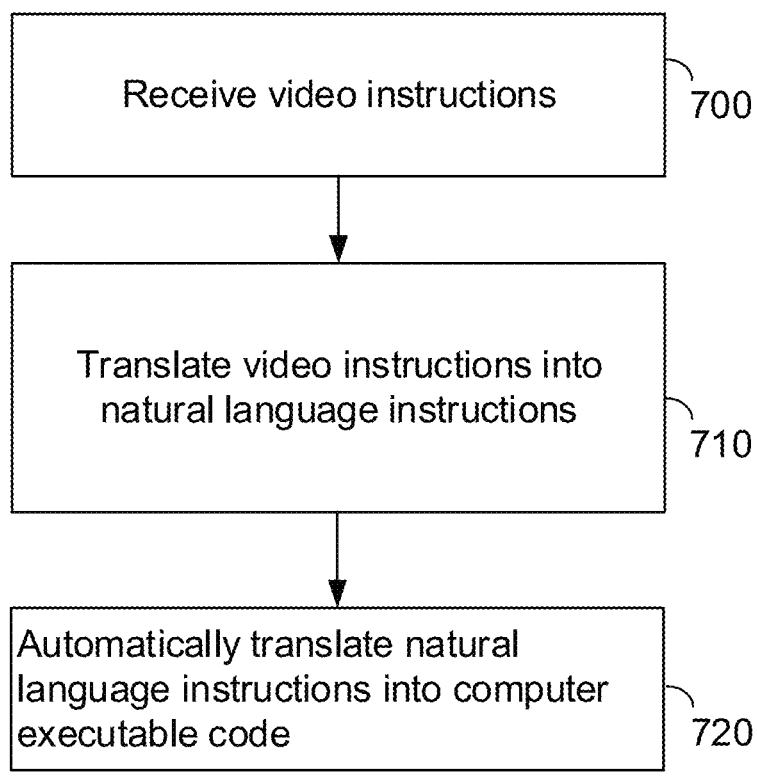

Attention now turns to further details of exemplary processes of automatically translating search results into executable code. FIG. 6 is a flowchart illustrating process steps for automatically implementing text-based instructions for modifying application programs in accordance with embodiments of the disclosure, and FIG. 7 is a flowchart illustrating process steps for automatically implementing video- or audio-based instructions for modifying application programs in accordance with embodiments of the disclosure.

In Step 510 of FIG. 5, search results for a way to modify an application program are received and automatically translated into executable code for carrying out this modification. FIG. 6 illustrates further details of the translation process when the returned search result is a text-based file such as a web page. Here, a file is selected from among the returned search results. The translation module 416 then translates this file into natural language instructions (Step 600). Files may be selected in any manner. In one embodiment, files with clearly defined discrete steps that are well-explained are preferable. Such files can be determined in any manner, such as by use of machine learning models trained to identify text containing a distinct set of steps. Any one or more such models can be used, including models for identifying text patterns known to indicate steps in a process, a set of visually distinct steps, or the like. Files may also be selected via keyword recognition, as below. That is, the presence, positions, and/or order of certain keywords may indicate a well-defined set of steps, thus indicating a file that is a good candidate for translation into executable code.

Translation from text to instructions may be performed in any manner. As one example, known natural language understanding methods can be implemented to infer meanings of segments of text or individual instructions, and lines or other segments determined to correspond to instructions for carrying out application modification processes may be selected for further processing. The identification of such instructions by natural language understanding processes may be assisted in known manner by metadata describing contexts of the problem, such as the application program name and type of problem presented.

As another example, metadata may provide keywords which are used to determine individual instructions via matching. For example, keyword matches can indicate the beginning or end of instructions, so that text can be broken into a series of steps according to keywords. Translation module 416 may store a number of keywords that are useful in separating textual instructions, such as "first," "next," "third," "if . . . then," and the like. any one or more words may be used as keywords. As can be observed, a keyword such as "next" may indicate the beginning of a new instruction, and thus the beginning of a segment, while terms like "first" may indicate the beginning of the first of a series of instructions. Portions of text outside these identified segments may be discarded, or scanned using other methods to determine their meaning. In this manner, text may be automatically divided into segments which correspond to individual instructions in the application modification process.

The series of instructions may then be automatically translated into computer executable code (Step 610). As above, instruction database 240 may store executable code for carrying out different functions in various operating systems. In one embodiment, these instructions may correspond to the various inputs that users would enter to perform the desired application modification manually. For example, database 240 may store instructions for opening a particular application in iOS and for opening it in Android, instructions for accessing a settings page of that particular application (e.g., scroll to bottom, swipe right, select button, and the like) in iOS and in Android, entering specific values into designated fields of an application page, and the like. As above, for each determined instruction, the translation module 416 may determine a meaning of the instruction, such as by natural language understanding processes that infer a meaning of input text. The meaning may alternatively be determined by keyword matching or by any other known method of interpreting natural language text. Metadata may be employed to assist in determining meaning and context, as further explained below. The determined meaning and application information (e.g., appended metadata) are then used to select the corresponding code portion from database 240. The retrieved code is then assembled using the order of determined instructions, to form a set of executable code that collectively carries out the application modification described in the returned search result.

FIG. 7 illustrates further details of the translation process when the returned search result is a video-based file such as a web page. Here, the search returns, among other results, a video file containing instructions in video form (Step 700). The video file is then translated into natural language instructions for modifying the application (Step 710). To do so, the video file is first converted to text via speech to text code of translation module 416, which converts an audio signal of the video file to text-based natural language instructions. These natural language instructions are then translated into computer executable code (Step 720) as in Steps 600-610 above.

The steps of FIG. 7 involve conversion of the audio portion of a video file to natural language instructions, which are then translated into computer executable code. Accordingly, one of ordinary skill in the art will observe that the processes of FIG. 7 can also be employed to convert audio files to computer executable code.

Figure 8:
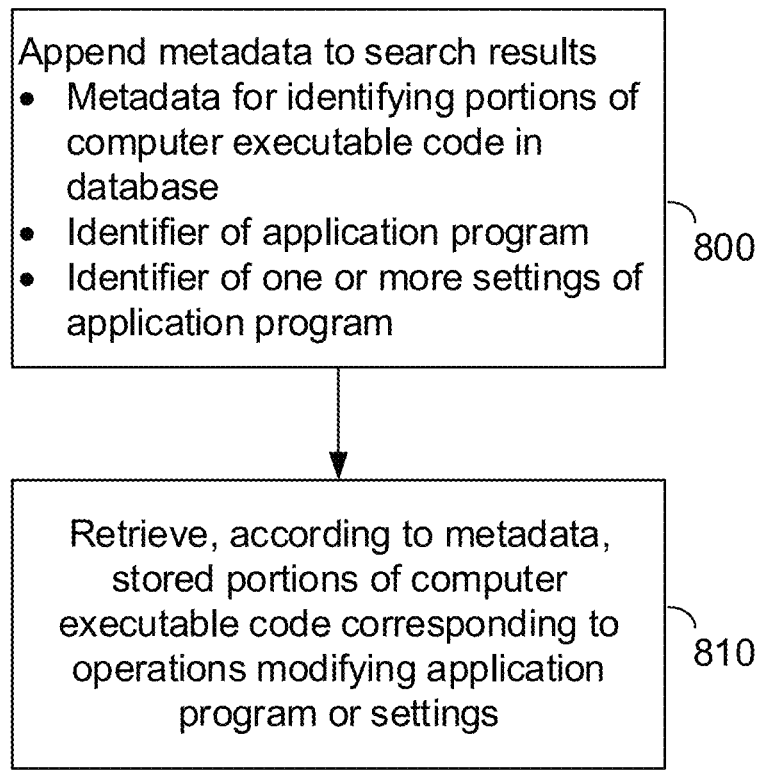

FIG. 8 is a flowchart illustrating process steps in appending and using metadata to assist in the process of automatically translating retrieved instructions to executable code. After Step 500 of FIG. 5, where search results are received, certain results are selected for conversion to executable code, and translation module 416 appends metadata to these results (Step 800). The metadata may be any metadata that aids in identifying the code snippets of instruction database 240 to be used in the computer executable code. This may include identifiers of the application program such as application name and version number, as well as identifiers of one or more settings of the application, such as those settings that are to be modified. The metadata may the be used to assist the conversion of these search results to natural language instructions in Step 510. For example, setting names from metadata can be used to verify the settings of each step or segment of the instructions, with metadata setting names being substituted into the instruction steps to capitalize settings for ready identification, in case the original instructions contain spelling errors, or the like. The resulting natural language instructions may appear as follows:

<step1>Open Settings off device</step1>
    <step2>Scroll to Accessibility and tap</step2>
    <step3>Scroll to Auto-rotate screen and top</step3>

These natural language instructions and metadata are then used to retrieve stored portions of computer executable code corresponding to operations modifying the application program or its settings (Step 810). For example, each step above describes a particular operating system function that can be carried out for a specific application program. Corresponding code for carrying out each such function can be stored in database 240, retrievable according to the following format:

<App><vers><OS><Action1><Sequence of Steps><Precursor Action> where:
    <App> refers to the application program name
    <vers> is the application version <OS> is the operating system used
<Action> is the action to be taken, e.g., Open Settings
<Sequence of Steps> is the steps taken to accomplish the desired application modification, e.g.:
  1. Press Home Button
  2. Scroll to Settings
  3. Tap Settings
<Precursor Action> is an optional storage optimizer that can be used to build further actions from this code Thus, code for each step can implement an operating system function that produces an input to an application program. Examples include selecting and opening a specific application, scrolling, implementing button presses, entering numerical values, screen swipes, opening/closing applications, and the like. Executable code for performing the steps (step1, step2, step3, etc.) above can be found in database 240 from the steps and accompanying metadata, by matching the corresponding format fields. The resulting retrieved executable code is then assembled into a single executable for transmission to the appropriate device 200 according to the order given by the steps (step1, step2, step3, etc.). The format shown above for database 240 is exemplary, and code snippets can be stored in any suitable form and/or format that allows for retrieval.

Figure 9:
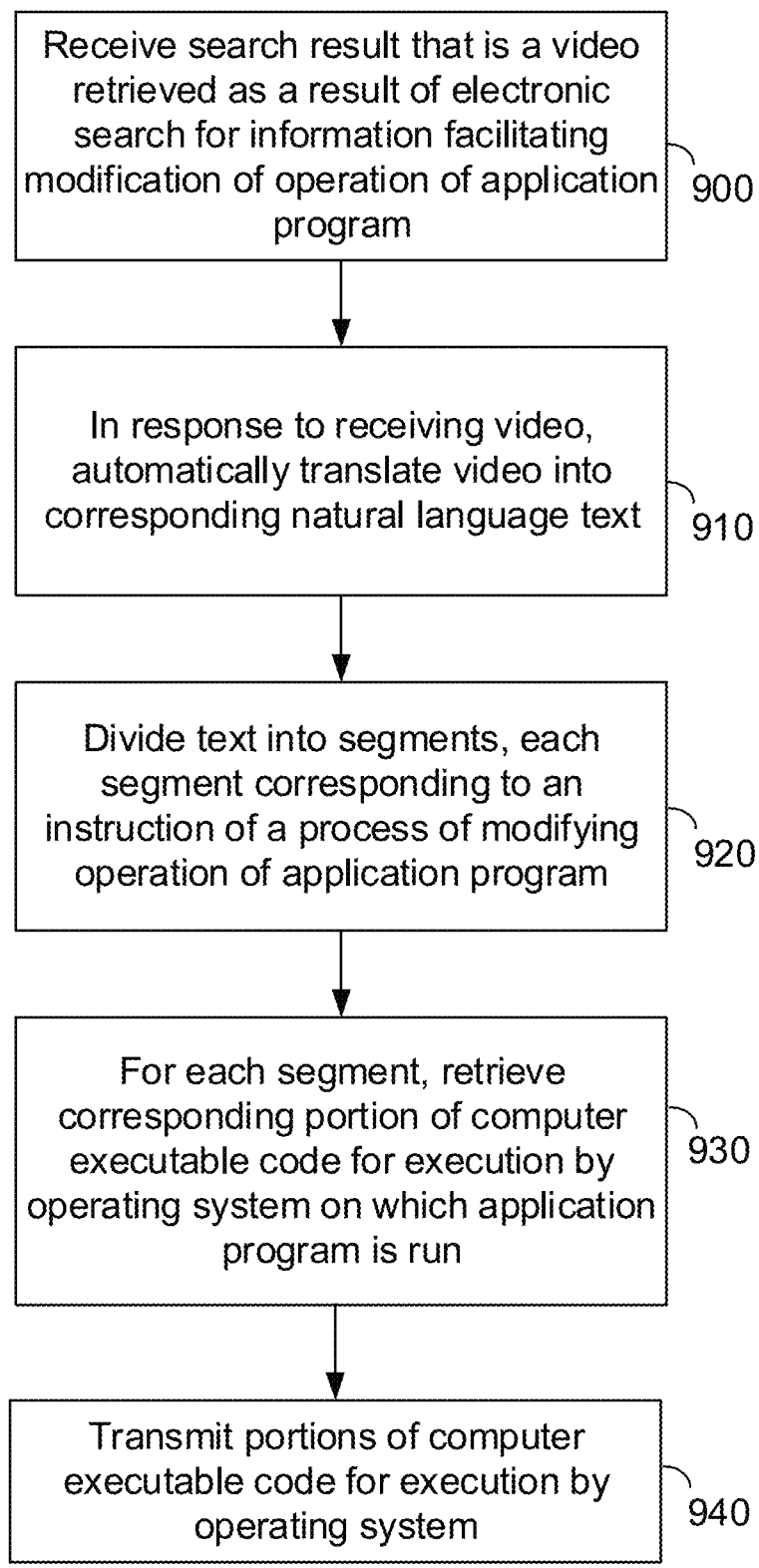
FIG. 9 is a flowchart illustrating process steps for automatically implementing video-based instructions for modifying application programs, in accordance with embodiments of the disclosure.

Search results may be video files, as well as text files. FIG. 9 is a flowchart illustrating process steps for automatically implementing video-based instructions for modifying application programs, in accordance with embodiments of the disclosure. As in previous embodiments, a search is first conducted for how to modify an application. The application modification server 230 receives search results, at least one of which is a video containing information on modifying operation of the application program (Step 900). Upon receiving this video, server 230 automatically translates its contents into natural language text (Step 910). Translation can be performed in any manner, as above. This step may also include metadata attachment as in FIG. 8.

As in previous embodiments, this text is divided into segments, with each segment corresponding to an instruction of a process for modifying operation of the application (Step 920). As above, segmentation can be accomplished in any manner, such as by position of certain keywords within the natural language text or by machine learning models trained to break text into segments each having a distinct meaning or context. Then, for each of these segments, the server 230 retrieves the corresponding portion of computer executable code from database 240 (Step 930), where the executable code snippets corresponding to each segment are assembled to form a complete executable for carrying out the application modification desired by the user. Appended metadata may be used to assist in the retrieval of correct code snippets for each segment, as in FIG. 8. The executable is then transmitted to the appropriate device 200 for execution (Step 940).

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, executable code can be translated from videos, audio files, or text files. Search results can be converted to natural language instructions in any manner. Similarly, these natural language instructions can be divided into segments or individual instructions in any manner, and each segment can be converted to executable code in any manner. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A method of automatically executing instructions from search results for modifying an operation of an application program, the method comprising:
    receiving, using processing circuitry, one or more search results, wherein the one or more search results are retrieved as results of an electronic search for information facilitating modification of an operation of an application program;
    automatically translating, in response to the receiving the one or more search results and using the processing circuitry, the one or more search results comprising instructions of a process of modifying the operation of the application program into computer executable code for execution by an operating system on which the application program is run;
    transmitting, using the processing circuitry, the computer executable code for automatic execution by the operating system on which the application program is run; and
    automatically executing, using the processing circuitry, the computer executable code by the operating system on which the application program is run to modify the operation of the application program.

2. The method of claim 1, wherein:
    the one or more search results further comprise natural language instructions; and
    the automatically translating further comprises automatically translating the natural language instructions into the computer executable code.

3. The method of claim 1, wherein the receiving further comprises receiving the one or more search results from an electronic computing device, and wherein the transmitting further comprises transmitting the computer executable code to the electronic computing device.

4. The method of claim 3, wherein the electronic computing device has the operating system and the application program stored thereon, and wherein the transmitting further comprises transmitting the computer executable code to the electronic computing device for execution of the computer executable code by the operating system on which the application program is run.

5. The method of claim 4, wherein the transmitting further comprises transmitting the computer executable code to the electronic computing device for execution of the computer executable code by the operating system while the application program is being run, and wherein the computer executable code comprises instructions for performing operating system functions generating inputs to the application program.

6. The method of claim 1, wherein the computer executable code further comprises instructions for the operating system to automatically execute the computer executable code.

7. The method of claim 1, wherein:
the one or more search results further comprise video instructions; and
the automatically translating further comprises automatically translating the video instructions of a process of modifying the operation of the application program into natural language instructions, and automatically translating the natural language instructions into the computer executable code.

8. The method of claim 1, wherein the automatically translating further comprises appending metadata to the one or more search results, and wherein the metadata is for identifying portions of the computer executable code.

9. The method of claim 8, wherein the metadata comprises one or more of an identifier of the application program or one or more settings of the application program.

10. The method of claim 9, wherein the automatically translating further comprises retrieving, according to the metadata, stored portions of the computer executable code corresponding to operations modifying the application program or the one or more settings of the application program.

11. A system for automatically executing instructions from search results for modifying an operation of an application program, the system comprising:
a storage device; and
control circuitry configured to:
receive, using processing circuitry, one or more search results, wherein the one or more search results are retrieved as results of an electronic search for information facilitating modification of an operation of an application program;
automatically translate, in response to the receiving the one or more search results and using the processing circuitry, the one or more search results comprising instructions of a process of modifying the operation of the application program into computer executable code for execution by an operating system on which the application program is run;
transmit, using the processing circuitry, the computer executable code for automatic execution by the operating system on which the application program is run; and
automatically execute, using the processing circuitry, the computer executable code by the operating system on which the application program is run to modify the operation of the application program.

12. The system of claim 11, wherein:
the one or more search results further comprise natural language instructions; and
the automatically translating further comprises automatically translating the natural language instructions into the computer executable code.

13. The system of claim 11, wherein the receiving further comprises receiving the one or more search results from an electronic computing device, and wherein the transmitting further comprises transmitting the computer executable code to the electronic computing device.

14. The system of claim 13, wherein the electronic computing device has the operating system and the application program stored thereon, and wherein the transmitting further comprises transmitting the computer executable code to the electronic computing device for execution of the computer executable code by the operating system on which the application program is run.

15. The system of claim 14, wherein the transmitting further comprises transmitting the computer executable code to the electronic computing device for execution of the computer executable code by the operating system while the application program is being run, and wherein the computer executable code comprises instructions for performing operating system functions generating inputs to the application program.

16. The system of claim 11, wherein the computer executable code further comprises instructions for the operating system to automatically execute the computer executable code.

17. The system of claim 11, wherein:
the one or more search results further comprise video instructions; and
the automatically translating further comprises automatically translating the video instructions of a process of modifying the operation of the application program into natural language instructions, and automatically translating the natural language instructions into the computer executable code.

18. The system of claim 11, wherein the automatically translating further comprises appending metadata to the one or more search results, and wherein the metadata is for identifying portions of the computer executable code.

19. The system of claim 18, wherein the metadata comprises one or more of an identifier of the application program or one or more settings of the application program.

20. The system of claim 19, wherein the automatically translating further comprises retrieving, according to the metadata, stored portions of the computer executable code corresponding to operations modifying the application program or the one or more settings of the application program.

* * * * *